United States Patent [19]

Layer

[11] 4,324,717
[45] Apr. 13, 1982

[54] NORBORNENE POLYMERS STABILIZED WITH HINDERED AROMATIC ALCOHOLS

[75] Inventor: Robert W. Layer, Cuyahoga Falls, Ohio

[73] Assignee: The B. F. Goodrich Company, Akron, Ohio

[21] Appl. No.: 162,300

[22] Filed: Jun. 23, 1980

[51] Int. Cl.$^3$ .................. C08K 5/35; C08K 5/34; C08K 5/17
[52] U.S. Cl. .................. 524/244; 544/403; 524/248; 524/245; 524/99; 524/96; 524/100; 524/553
[58] Field of Search .................. 526/308, 283; 260/45.9 QA, 45.9 QB, 45.8 NZ, 45.8 N, 45.9 AA

[56] References Cited

U.S. PATENT DOCUMENTS

| | | | |
|---|---|---|---|
| 2,802,810 | 8/1957 | Bill | 260/45.9 R |
| 2,997,455 | 8/1961 | Broich et al. | 260/45.9 R |
| 3,072,604 | 1/1963 | Tholstrup | 260/45.9 QB |
| 3,098,841 | 7/1963 | Morris et al. | 260/45.9 QB |
| 3,202,711 | 8/1965 | Fruhstorfer et al. | 260/45.9 R |
| 3,343,582 | 9/1967 | Himes et al. | 526/283 |
| 3,549,587 | 12/1970 | Nicholson et al. | 260/45.8 NZ |
| 3,991,139 | 11/1976 | Kokuryo et al. | 260/45.7 PH |
| 4,010,140 | 3/1977 | Bullard et al. | 526/283 |
| 4,028,416 | 6/1977 | Robin et al. | 260/45.9 R |
| 4,097,527 | 6/1978 | Kline | 260/45.9 R |
| 4,102,834 | 7/1978 | Morimoto et al. | 526/283 |

*Primary Examiner*—V. P. Hoke
*Attorney, Agent, or Firm*—George A. Kap; Nestor W. Shust

[57] ABSTRACT

Mannich bases of hindered aromatic alcohols are incorporated in polymeric norbornene materials to improve their resistance to oxidation.

10 Claims, No Drawings

NORBORNENE POLYMERS STABILIZED WITH HINDERED AROMATIC ALCOHOLS

BACKGROUND OF THE INVENTION

Preparation of norbornene monomers is well known. Dicyclopentadiene can be made by dimerizing cyclopentadiene by a Diels-Alder reaction whereas dihydrodicyclopentadiene can be made by the Diels-Alder reaction of cyclopentadiene and cyclopentene. Norbornenes can also be prepared by the Diels-Alder reaction of cyclopentadiene with selected olefins to yield either norbornene or substituted norbornenes. Tetracyclododecene compounds are byproducts formed from the Diels-Alder reaction of cyclopentadiene and norbornenes. Symmetrical and unsymmetrical trimers and tetramers of cyclopentadiene can, likewise, be prepared by the Diels-Alder reaction of cyclopentadiene.

Norbornene polymeric materials, i.e., those prepared from monomers containing a norbornene moiety, are well known. They can be prepared as elastomers, which are flexible at room temperature, or as plastics, which are rigid at room temperature. Although essentially all of the important physical properties of the norbornene polymeric materials are outstanding, their resistance to oxidation is less than desired. It is, therefore, an object of this invention to stabilize norbornene polymeric materials against oxidative degradation.

SUMMARY OF THE INVENTION

This invention relates to a composition of matter which comprises a reaction product of a norbornene polymeric material and a sufficient amount of an antioxidant selected from hindered aromatic alcohols to improve resistance thereof to oxidation.

DETAILED DESCRIPTION OF THE INVENTION

Pursuant to the invention described and claimed herein, norbornene polymeric materials are treated with Mannich bases of aromatic alcohols in order to impart antioxidant property to such materials. The Mannich bases will also be referred to herein as hindered aromatic alcohols or hindered phenols. Although Mannich bases of aromatic alcohols have been used in the past with other polymeric materials to improve antioxidant property thereof, the extent of improvement in polymeric norbornene materials treated with Mannich bases of aromatic alcohols was dramatic and totally unexpected.

The class of norbornene polymeric materials referred to herein includes homopolymers and polymers of two or more of the monomers that contain the norbornene moiety, defined structurally as follows:

Pursuant to this definition, norbornene polymeric materials include homopolymers, copolymers, terpolymers, and generally polymers of substituted and unsubstituted norbornenes, dicyclopentadienes, dihydrodicyclopentadienes, and tetracyclododecenes. Norbornene polymeric materials can also have polymerized therein small amounts of non-norbornene monomers.

Norbornene, or bicycloheptene-2 monomers, which are included within the scope of this invention, are defined as follows:

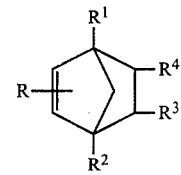

where each R, $R^1$, $R^2$, $R^3$ and $R^4$ can separately be hydrogen, alkyl or alkenyl group containing 1 to 20 carbon atoms, and where $R^3$ and $R^4$ can be joined to form an aryl group of 6 to 18 carbon atoms or a cycloalkyl or cycloolefin group of 5 to 6 carbon atoms. Preferably, R, $R^1$ and $R^2$ are hydrogens and $R^3$ and $R^4$ are individually selected from hydrogen and alkyl or alkenyl groups of 1 to 5 carbon atoms. The alkyl and alkenyl groups can be substituted with ester, nitrile, substituted and unsubstituted phenyl and halogen groups. Examples of such norbornene monomers include 2-norbornene (where all Rs are hydrogens), 5-methyl-2-norbornene, 6-methyl-2-norbornene, 5,6-dimethyl-2-norbornene, 5-pentadecyl-2-nobornene, 5-ethyl-2-norbornene, 5-butyl-2-norbornene, 5-vinyl-2-norbornene, 5-propenyl-2-norbornene, and 5-butenyl-2-norbornene.

Dicyclopentadiene and dihydrodicyclopentadiene monomers have the following structural formulas:

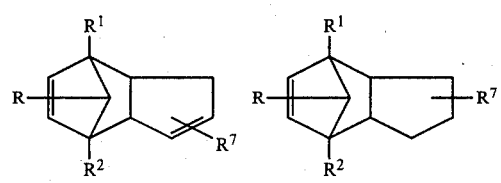

dicyclopentadiene      dihydrodicyclopentadiene where R, $R^1$ and $R^2$ are defined as above and there can be up to three $R^7$ groups which are defined as $R^1$. Tetracyclododecene monomers and symmetrical trimers of cyclopentadiene have the following respective structural formulas:

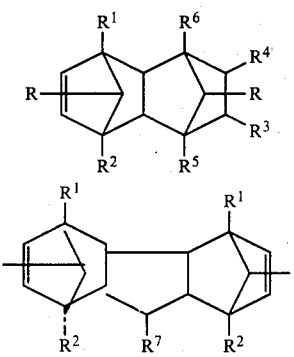

where R, $R^1$, $R^2$, $R^3$, $R^4$ and $R^7$ are defined as above whereas $R^5$ and $R^6$ are individually selected from hydrogen, alkyl and alkenyl groups of 1 to 20 carbon atoms, preferably $R^5$ and $R^6$ are hydrogens.

Other monomers can be polymerized with norbornene-type monomers. Such other monomers include cyclopentene and other monocyclic mono and diolefins. Amount of such monomers in the polymerization recipe can vary up to 100 parts by weight per 100 parts of the norbornene polymeric material, preferably 10 to 50 parts.

Polymerization of the norbornene-type monomers is conducted in the presence of a catalyst mixture which comprises (a) at least one organoaluminum halide and (b) at least one tungsten or molybdenum salt or a mixture of these salts. The organoaluminum halide which is utilized in the catalyst mixture can be either a dihalide of the formula $RAlX_2$ or aluminum sesquihalide of the formula $R_3Al_2X_3$, wherein R is an alkyl radical containing from 1 to about 12 carbon atoms, preferably about 2 to 4 carbon atoms, and X is a halogen.

The organoaluminum halides or mixtures of organoaluminum halides are employed at a level of from about 0.01 to about 20 or more millimoles per mole of monomer, and the molybdenum or tungsten salts are employed at a level of from about 0.001 to about 1.0 millimoles per mole of monomer mixture. The molar ratio of organoaluminum halide to molybdenum and/or tungsten salt(s) is not critical and may range from about 200:1 or more to about 1:10 although a ratio within the range of from 4:1 to about 2:1 is preferred.

In a preferred embodiment, the organoaluminum halide and the salts of tungsten and molybdenum are dissolved in a solvent prior to incorporation into the monomer mixture. The addition of the catalyst components as solutions facilitates the handling thereof and also results in a brief induction period after addition to the monomer mixture which permits the addition of all of the components of the reaction mixture before substantial polymerization begins. The result is a more uniform process control, and ultimately, reduced gel formation. Generally, the organoaluminum halide will be predissolved in the same hydrocarbon solvent as used for conducting the polymerization reaction. Thus, preferred solvents for the organoaluminum halides are the aromatic solvents such as benzene, toluene, etc.

The preferred solvents for the molybdenum and tungsten compounds comprise at least one alkylester of a saturated carboxylic or dicarboxylic acid. The concentration of the salts in the ester solvents may vary from as low as about 0.1 molar. Examples of the preferred ester solvents include methyl formate, ethyl formate, methyl chloroformate, ethyl chloroformate, methyl acetate, ethyl acetate, n-propyl acetate, ethyl propionate and dimethyl malonate. Excellent results have been obtained with ethyl acetate.

A polymerization activator may be used but is not generally required. Excellent activation is obtained by using air or a peroxide or hydroperoxide, and especially the organic peroxide such as benzoyl peroxide. The activator may be added at any point in the charging procedure, but is more preferably added last.

The molecular weight of the copolymers prepared in accordance with the process of the invention can be controlled or modified when the reaction is conducted in the presence of at least one non-conjugated acyclic olefin containing from two to about 12 carbon atoms and having at least one hydrogen on each double-bonded carbon atom. Examples of suitable compounds include the 1-olefins such as 1-butene, 3-methyl-1-butene, 1-hexene; the 2-olefins such as 2-pentene, 4-methyl-2-pentene; 3-olefins such as 5-ethyl-3-octene; non-conjugated diolefins such as 1,6-hexadiene; and non-conjugated triolefins such as 1,4-octatriene. The preferred non-conjugated acyclic olefins are the 1-olefins of the type described above. It is believed that the acrylic olefins act as molecular weight modifiers which provide an easily workable and generally hydrocarbon-soluble polymer.

The non-conjugated acyclic olefin or a mixture of such olefins is used in a molar ratio of olefin to total monomer charge of from about 0.0001:1 to about 0.3:1. The non-conjugated acyclic olefins can be charged directly or in solution at any point in the charging procedure, but it is preferred that the olefins be charged along with the monomers.

The polymerization reaction can be performed as a batch or continuous process. The reaction mixture in the reaction vessel may be cooled or heated to the polymerization temperature at the start of the additions or at any point during the addition of the various reactants. Polymerization temperatures of from about $-80°$ C. to about 100° C. are utilized although the reaction generally proceeds satisfactorily at about room temperature.

If desired, the polymerization reaction can be short-stopped by the addition of alcohols, amines or carboxylic acids such as ethanol, t-butyl phenol, diethylamine, acetic acid, etc.

At the conclusion of the polymerization reaction, the copolymer product may be isolated by any of the methods known in the art such as by direct drying under reduced pressure, by precipitation or by steam or by stripping with hot water. The polymer is recovered and may be washed further and then dried. The copolymers of the invention are substantially gel-free, and generally are rigid plastics or glass-like at room temperature. When extended with an oil, the copolymers behave as elastomers.

The Mannich bases of aromatic alcohols, especially phenols and naphthols, suitable for purposes herein include hindered aromatic alcohols, such as hindered phenols and hindered naphthols. The term "hindered" denotes that at least one position adjacent to the hydroxyl group, the ortho position, is substituted. Hindered phenols suitable for purposes herein are defined by the following structural formula:

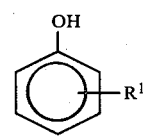

where there can be 1 to 5, preferably 2 to 3 $R^1$ groups on the phenyl ring each individually selected from alkyl, alkoxy, hydroxyl and hydroxyalkyl groups wherein the carbon chains contain 1 to 12, preferably 1 to 6, carbon atoms; and where at least one and up to three $R^1$ groups are selected from alkylaminoalkyl groups, i.e., $-CH_2N(R^2)(R^3)$, where $R^2$ and $R^3$ groups are individually selected from hydrogen and hydroxy substituted and unsubstituted normal and branched alkyl groups containing 1 to 12, preferably 1 to 6, and more preferably 1 to 2 carbon atoms, provided that not more than one of $R^2$ and $R^3$ groups is hydrogen, and where $R^2$, $R^3$ and N of the alkylaminoalkyl group form a heterocyclic ring containing 5 to 7 atoms selected from carbon, oxygen, nitrogen and sulfur atoms, provided that the alkylaminoalkyl group or groups are located only ortho and/or para to the hydroxyl group on the phenyl ring.

Bis compounds of the aforementioned Mannich bases are also suitable as antioxidants for norbornene polymeric materials. Such bis compounds are bridged through the nitrogen atom of the aminomethyl moiety by means of a chain of 2 to 12, preferably 2 to 6 carbon atoms, or by means of a heterocyclic structure containing 5 to 7 atoms, 2 of which, preferably, are nitrogen atoms and 3 to 5 are carbon atoms.

Also suitable as effective stabilizers for polymeric norbornene-type materials are Mannich bases of naphthols, which are defined similarly as the above Mannich bases of phenols. Although both of the phenyl groups in these naphthols can be substituted in a similar manner as the single phenyl group of the Mannich bases of phenols, preferably, each phenyl group is unsubstituted. Mannich bases of naphthol are defined by the following structural formula:

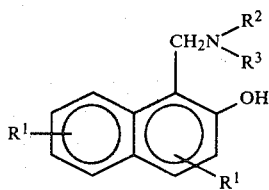

where there can be up to six $R^1$ groups on the naphthol group, preferably up to 2, which are individually selected from hydrogen, alkyl, alkoxy, hydroxyl and hydroxyalkyl wherein the alkyl groups contain 1 to 12, preferably 1 to 6 carbon atoms; and $R^2$ and $R^3$ are as defined above in connection with Mannich bases of phenols. In a more preferred embodiment, all $R^1$ groups are hydrogens and $R^2$ and $R^3$ are selected from alkyl groups of 1 to 4 carbon atoms.

In a preferred embodiment, the antioxidant is selected from hindered phenols which have the following structural formula:

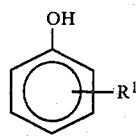

where there are three $R^1$ groups on the phenyl ring in the two ortho and the one para positions to the hydroxyl group, said $R^1$ groups are individually selected from alkyl, alkoxy, and dialkylaminomethyl groups wherein said alkyl, alkoxy and the two alkyl groups in the dialkylaminomethyl groups each contain 1 to 6 carbon atoms, at least one of the $R^1$ group being a dialkylaminomethyl group. In a more preferred embodiment, 1 to 2 $R^1$ groups are selected from dialkylaminomethyl groups positioned ortho to the hydroxyl group, the two alkyl groups of which individually contain 1 to 2 carbon atoms.

Specific examples of suitable Mannich bases of phenols and naphthols are given in the accompanying examples.

The Mannich reaction is well known and consists of condensation of ammonia or a primary or a secondary amine, with formaldehyde and a compound containing at least one reactive hydrogen atom, usually in the presence of an acid catalyst, such as hydrochloric acid. The essential feature of the reaction is the replacement of the active hydrogen atom by an aminomethyl or substituted aminomethyl group. The ortho and para hydrogens in phenols are sufficiently active to enter into a Mannich reaction. Products from phenol, 4-acetaminophenol, ortho and para cresols, meta cresol, 3,5-dimethylphenol, 2-methyl-4-ethylphenol, 2- and 4-methoxyphenol, beta-naphthol, and 8-hydroxyquinoline with formaldehyde and diethylamine or piperidine or morpholine are well known. From ortho and para cresol, mono and disubstitution products can be obtained whereas from phenol and metacresol, trisubstitution products can be made.

Mannich bases of phenols and naphthols have been used as antioxidants in connection with other polymeric materials. To demonstrate relative effectiveness of the Mannich bases as antioxidants in other polymeric materials as compared to known commercial antioxidants, 0.68 g of a Mannich base antioxidant was mixed with 68 g of reprecipitated SN rubber in a Brabender Plasticorder for 2 minutes at 80° C. Mooney buttons were then made, aged at 70° C. for 10 days and tested at 10 minute shearing time to determine retained Mooney viscosity. Two controls containing BHT and AO 2246 had retained viscosity of 96% and 89%, respectively, whereas Mannich base of phenol, which corresponds to compound 10 in the examples herein, had retained Mooney viscosity of only 58%; Mannich base of phenol, which corresponds to compound 9 in the examples herein, had retained Mooney viscosity of only 23%; and Mannich base of naphthol, which corresponds to compound 6 in the examples herein, had retained Mooney viscosity of 75%. Two other Mannich bases of phenols were tested which do not have counterparts in the examples herein although they are very similar in structure to the tested compounds. These two compounds are identified below with the indicated retained Mooney viscosity of SN rubber samples containing same:

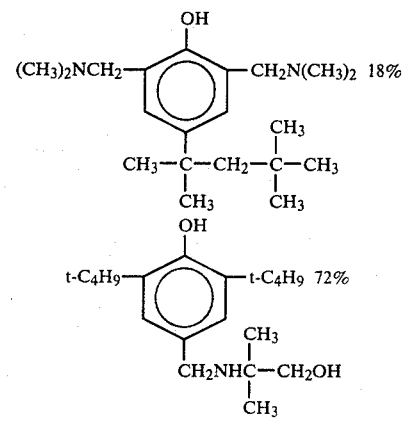

Based on the results presented above, it should be apparent that Mannich bases of phenols and naphthols in SN rubber perform considerably poorer than the conventional commercial stabilizers.

Examples presented below illustrate the invention claimed herein by demonstrating effectiveness of Mannich bases of phenols and naphthols as antioxidants in polymeric norbornene-type polymeric materials.

EXAMPLES

A large number of the subject antioxidants (AO) were tested in polymeric norbornene material which was prepared by polymerizing 55 parts dicyclopentadiene and 45 parts 5-methyl-2-norbornene. Samples were prepared by casting a film from a toluene solution containing the norbornene polymeric material and the antioxidant dissolved therein. The film was cast by depositing the toluene solution on a Mylar sheet and evaporating toluene. Thickness of the stabilized norbornene-type polymeric film was approximately 20 mils. Samples of the film were placed in an air oven maintained at 70° C. and the carbonyl region of the infrared spectrum at 1630 cm$^{-1}$ was monitored for oxidative failure. Days of testing to develop a fair amount of carbonyl is indicated as "Yes" and days of testing to failure or formation of a large carbonyl band is indicated as "Fail" in Table I, below:

TABLE I

| | AO Additive, 1 phr | Yes | Fail |
|---|---|---|---|
| 1. | 2246 AO | 5 | 6 |
| 2. | BHT AO | 5 | 6 |
| 3. | Ethyl 736 AO | 5 | 7 |
| 4. | Goodrite 3125 AO | 8 | 9 |
| 5. | Stalite S AO | 5 | 6 |
| 6. | 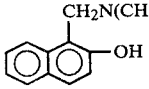 | 28 | 49 |
| 7. | 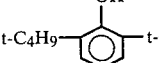 | 27 | 53 |
| 8. | 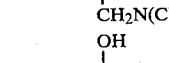 | 128 | >164 |
| 9. | 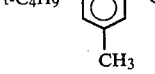 | 142 | >164 |
| 10. | 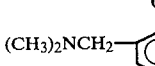 | 15 | >164 |
| 11. |  | 8 | 39 |
| 12. | 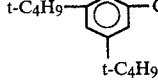 | 5 | 14 |
| 13. | 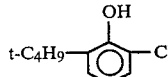 | 19 | 29 |
| 14. | 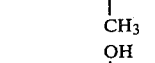 | 5 | 7 |
| 15. | 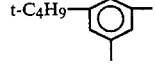 | 108 | 164 |
| 16. | 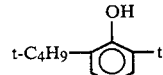 | 5 | 15 |

TABLE I-continued

| AO Additive, 1 phr | | Yes | Fail |
|---|---|---|---|
| 17. t-C₄H₉–[OH, t-C₄H₉]–CH₂NH–C(CH₃)₂–CH₂–C(CH₃)₂–CH₃ | | 5 | 11 |
| 18. (CH₃)₂NCH₂–[OH, OCH₃]–CH₂N(CH₃)₂ | | >>262 | test terminated without failure |
| 19. (n-C₄H₉)₂NCH₂–[OH, CH₂N(n-C₄H₉)₂]–CH₂N(n-C₄H₉)₂ | | 13 | 59 |
| 20. t-C₄H₉–[OH, CH₃]–CH₂N(n-C₄H₉)₂ | | 13 | 59 |
| 21. (n-C₄H₉)₂NCH₂–[OH, t-C₄H₉]–OH | | 31 | 83 |

At the top of the above Table I, several commercial antioxidants are noted which were used as controls for comparison purposes. Film samples containing the commercial antioxidants were prepared in the same manner as the film samples containing Mannich bases of phenols and naphthols. Table II, below identifies these commercial antioxidants by name and structural formulas:

TABLE II 1. 2246
   t-C₄H₉–[OH, CH₃]–CH₂–[OH, CH₃]–t-C₄H₉
   2,2'-methylene-bis-(4-methyl-6-t-butylphenol)

2. BHT
   t-C₄H₉–[OH, CH₃]–t-C₄H₉
   2,6-di-t-butyl-4-methylphenol

3. Ethyl 736
   t-C₄H₉–[HO, CH₃]–S–[OH, CH₃]–t-C₄H₉
   4,4'-thiobis-(2-methyl-6-t-butylphenol)

4. Stalite S
   H₁₇C₈–[ ]–NH–[ ]–C₈H₁₇
   4,4'-dioctyldiphenylamine

A careful study of Table 1, above, reveals that the commercial antioxidants developed a fair amount of carbonyl from 5 to 8 days and failed in 6 to 9 days. Of the Mannich bases of phenols and naphthols tested, the worst was No. 14, a Mannich base of a lower alkyl substituted naphthol, which developed a fair amount of carbonyl in 5 days and failed in 7 days. This performance is about equivalent to the commercial antioxidants. Samples which performed excellently are those which contained antioxidants No's. 6, 7, 8, 9, 10, 11, 13, 15, 18, 19, 20 and 21. For this group, a fair amount of carbonyl was formed in a period ranging from 29 days to in excess of 262 days and for most of these materials, failure occurred in a period of time in excess of 49 days. Antioxidant 18 was truly exceptional and the test was terminated before failure after only a small amount of carbonyl had developed in 212 days.

Antioxidant performance of Mannich bases of phenols and naphthols in norbornene polymeric materials is totally unexpected when compared to the performance of same and similar Mannich bases of phenols and naphthols in SN rubber, which is described above.

I claim:

1. Composition of matter comprising a norbornene polymeric material and an antioxidant in amount sufficient to provide the desired degree of protection from oxidation degradation, said norbornene polymeric material is prepared from norbornene monomers that contain the following moiety:

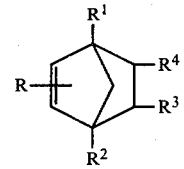

where each R, $R^1$, $R^2$, $R^3$, and $R^4$ is selected from hydrogen, alkyl and alkenyl groups of 1 to 20 carbon atoms, and groups formed by joining $R^3$ and $R^4$ selected from aryl groups of 6 to 18 carbon atoms, and cycloalkyl and cycloolefin groups of 5 to 6 carbon atoms; said antioxidant is selected from (A) hindered phenols, (B) bis compounds of said hindered phenols, (C) hindered naphthols, and mixtures of said antioxidants, said hindered phenols are selected from compounds falling within the definition of the following structural formula:

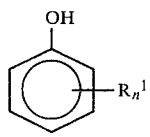

where n represents 1 to 5 $R^1$ groups on the phenol ring with at least one $R^1$ group positioned ortho to the hydroxyl group on said phenyl ring, said $R^1$ group or groups are individually selected from substituted and unsubstituted alkyl, alkoxy, hydroxyl, and hydroxyalkyl groups wherein carbon chains therein contain 1 to 12 carbon atoms; said $R^1$ group or groups are also individually selected from alkylaminoalkyl groups —$CH_2N(R^2)(R^3)$, provided, however, that at least one $R^1$ group is an alkylaminoalkyl group, where $R^2$ and $R^3$ groups are individually selected from hydrogen, and hydroxy substituted and unsubstituted normal and branched alkyl groups of 1 to 12 carbon atoms and where $R^2$, $R^3$ and N of said alkylaminoalkyl groups form a heterocyclic ring containing 5 to 7 atoms selected from carbon, nitrogen, oxygen, and sulfur atoms; said bis compounds of said hindered phenols are bridged through the nitrogen atom of said alkylaminoalkyl groups by a carbon chain containing 2 to 12 carbon atoms or by a heterocyclic structure of 5 to 7 atoms selected from carbon, nitrogen, oxygen, and sulfur atoms; and said hindered naphthols are defined same as said hindered phenols.

2. Composition of claim 1 where in the formula for the norbornene monomers, R, $R^1$ and $R^2$ are hydrogens and $R^3$ and $R^4$ are individually selected from hydrogen, and alkyl and alkenyl groups of 1 to 5 carbon atoms; and where in said hindered phenols there are 2 to 3 $R^1$ groups on the phenyl ring wherein the carbon chain in said $R^1$ group or groups contains 1 to 6 carbon atoms, said $R^2$ and $R^3$ groups contain 1 to 6 carbon atoms, not more than one of $R^2$ and $R^3$ groups is hydrogen, said alkylaminoalkyl group or groups are located only ortho and/or para to the hydroxyl group on said phenyl ring, said carbon chain in said bis compounds contain 2 to 6 carbon atoms, and said hindered naphthols have the following structural formula:

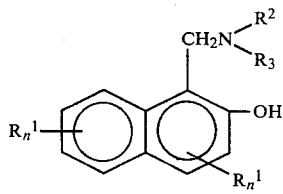

where n's can be same or different and the sum thereof represents up to six $R^1$ groups on the naphthyl group, the $R^1$, $R^2$ and $R^3$ groups aare defined as in the case of hindered phenols.

3. Composition of claim 2 wherein said heterocyclic structure is composed of 1 to 2 nitrogen atoms, one oxygen atom, with remainder being carbon atoms; at least one and up to three $R^3$ groups are selected from alkylamine groups; and said antioxidant is selected from said hindered phenols and mixtures thereof.

4. Composition of claim 2 wherein $R^2$ and $R^3$ groups of said hindered phenols contain 1 to 2 carbon atoms.

5. Composition of claim 4 wherein said norbornene polymeric material is selected from homopolymers and polymers of two or more substituted and unsubstituted monomers selected from norbornenes, dicyclopentadienes, dihydrodicyclopentadienes, tetracyclododecenes, and symmetrical and unsymmetrical trimers and tetramers of cyclopentadiene wherein substituents on said monomers are selected from ester, nitrile, substituted and unsubstituted phenyl, and halogen groups.

6. Composition of claim 5 wherein said norbornene polymeric material contains polymerized therein additional monomers selected from monocyclic monoolefins and diolefins in amount of 10 to 50 parts by weight per 100 parts of said norbornene polymeric material, and acyclic olefins containing 2 to 12 carbon atoms, amount of such additional monomers can vary from 0.0001 to 0.3 moles per mole of total monomer charge.

7. Composition of claim 5 wherein said norbornene polymeric material contains polymerized therein additional monomers selected from monocyclic monoolefins and diolefins in amount of 10 to 50 parts by weight per 100 parts of said norbornene polymeric material, and acyclic olefins containing 2 to 12 carbon atoms, amount of such additional monomers can vary from 0.0001 to 0.3 moles per mole of total monomer charge.

8. Composition of claim 5 wherein ssaid norbornene monomers are selected from 2-norbornene, 5-methyl-2-norbornene, 6-methyl-2-norbornene, 5,6-dimethyl-2-norbornene, 5-propenyl-2-norbornene, 5-butenyl-2-norbornene, and mixtures thereof; and said antioxidant is selected from hindered phenols falling within the following structural formula, and mixtures of such phenols:

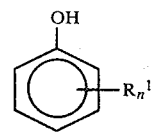

where n represents three $R^1$ groups on the phenyl ring in the two ortho and the one para positions to the hydroxyl group, said $R^1$ groups are selected from alkyl, alkoxy, hydroxyl, hydroxyalkyl and dialkylaminomethyl groups wherein said alkyl hydroxyalkyl and said two alkyl groups in said dialkylaminomethyl group each contain 1 to 6 carbon atoms.

9. Composition of claim 7 wherein said two alkyl groups in said dialkylaminomethyl group contain 1 to 2 carbon atoms, and said acyclic olefins are selected from non-conjugated olefins.

10. Composition of claim 8 wherein said alkoxy group contains 1 to 2 carbon atoms and wherein 1 to 2 $R^1$ groups are selected from dialkylaminomethyl groups which are positioned in the ortho position to the hydroxyl group.

* * * * *